Sept. 27, 1938.  A. J. WEATHERHEAD, JR  2,131,459
BRAKE
Filed Feb. 1, 1935  2 Sheets-Sheet 1
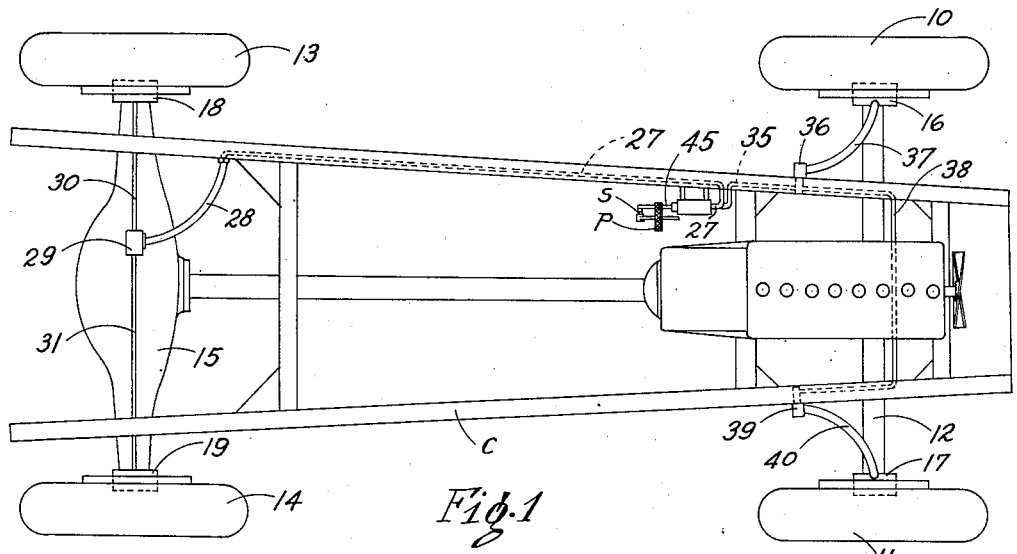
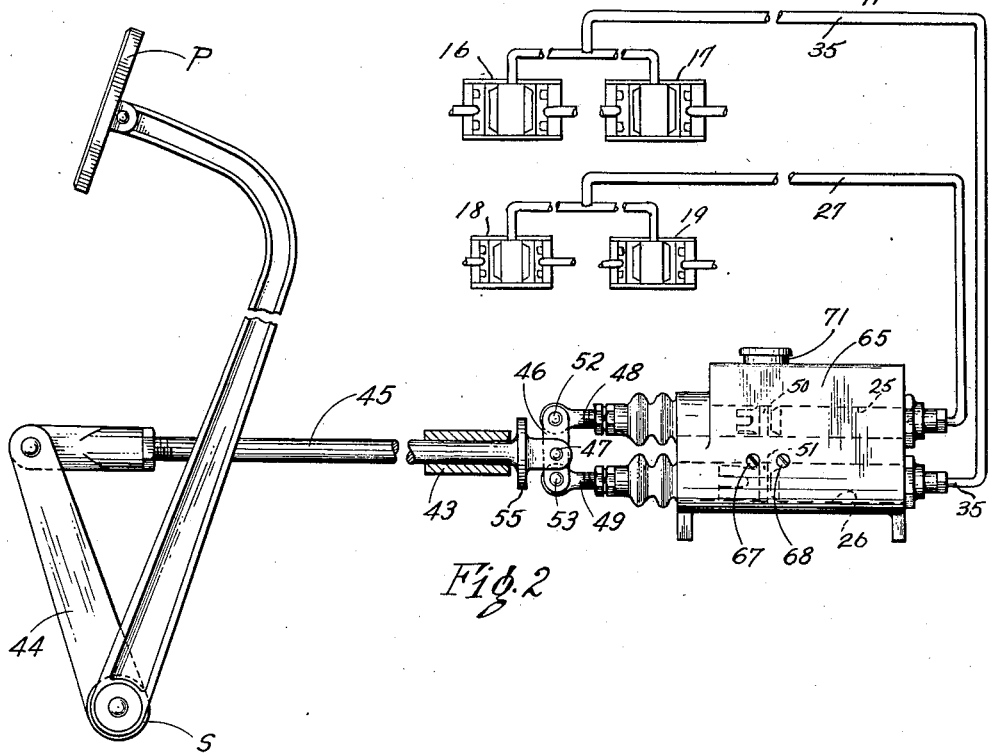
Inventor
ALBERT J. WEATHERHEAD, JR.
By  Rickey & Watts
Attorneys Sept. 27, 1938.  A. J. WEATHERHEAD, JR  2,131,459
BRAKE
Filed Feb. 1, 1935   2 Sheets-Sheet 2
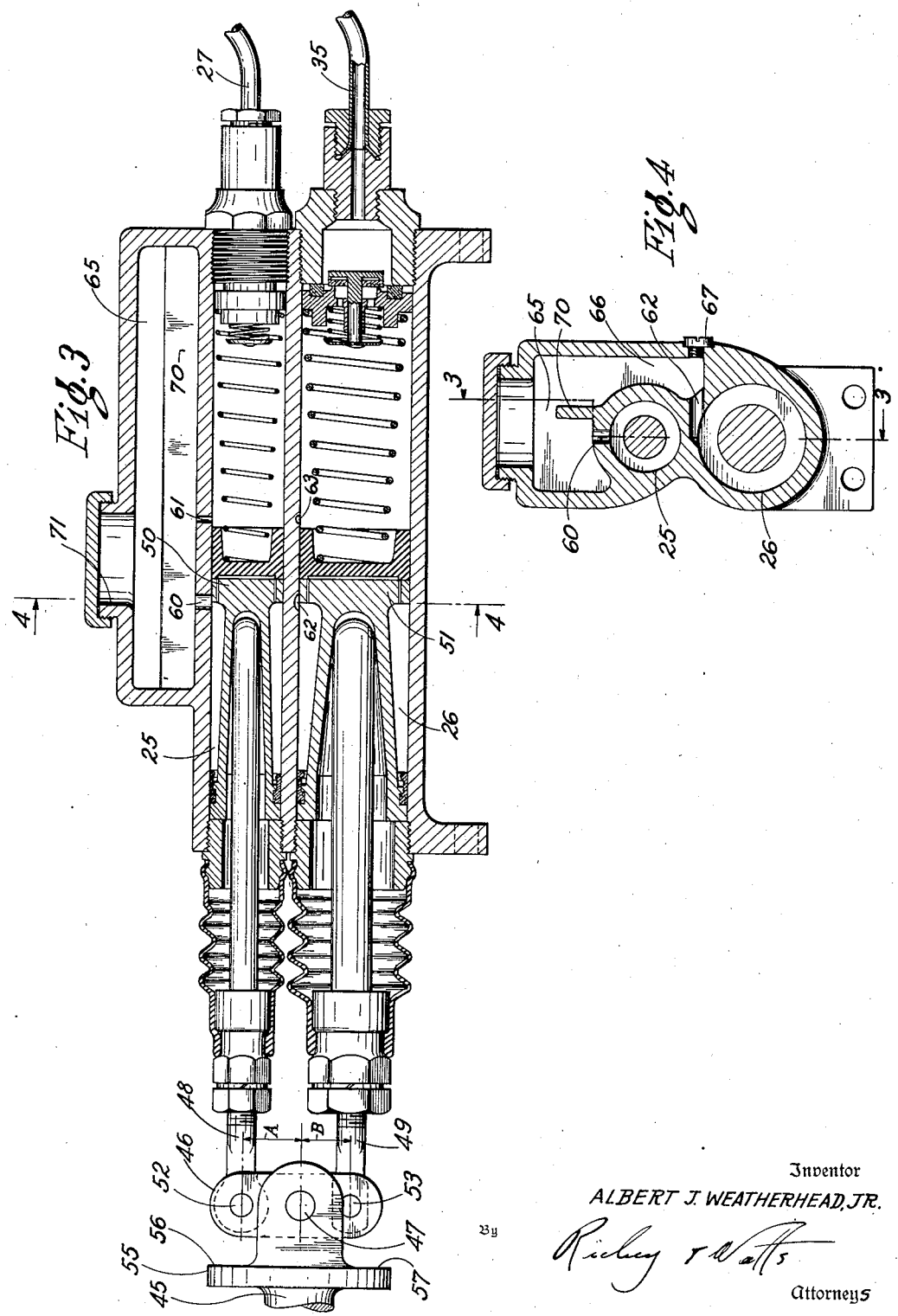
Inventor
ALBERT J. WEATHERHEAD, JR.
Attorneys Patented Sept. 27, 1938

2,131,459

UNITED STATES PATENT OFFICE 2,131,459

BRAKE

Albert J. Weatherhead, Jr., Cleveland, Ohio, assignor to The Weatherhead Company, Cleveland, Ohio, a corporation of Ohio Application February 1, 1935, Serial No. 4,468

8 Claims. (Cl. 188—152)

This invention relates to brakes and more particularly to fluid actuating systems for motor vehicle brakes.

In conventional types of hydraulic vehicle brakes now widely used, the actuating fluid is supplied by a master cylinder having a piston therein connected to the brake operating pedal. The fluid is distributed through suitable metallic tubing and flexible connections to wheel cylinders which are provided with pistons connected to the brake shoes, and upon application of pressure to the brake pedal the fluid pressure produced in the master cylinder is transmitted to the wheel cylinders causing the pistons in the wheel cylinders to expand the brake shoes into engagement with the brake drums. In the conventional system, a single master cylinder is employed with the result that a failure anywhere in the fluid system will result in a loss of fluid pressure throughout the system and the consequent failure of all of the brakes.

It is among the objects of my invention to provide a fluid pressure braking system embodying a plurality of master cylinders, each master cylinder and its associated wheel cylinders and fluid connections forming in effect a separate braking system so that the failure of the braking system associated with one master cylinder will not affect any brakes not associated with that particular system. Another object of my invention is to provide a hydraulic braking system embodying two or more master cylinders wherein the actuating forces applied to the pistons through various master cylinders may be automatically maintained in predetermined relationship to each other to maintain a predetermined relationship between the fluid pressures in the wheel cylinders of brakes connected to each of the various master cylinders. Another object is to provide a braking system embodying two or more master cylinders wherein the fluid pressures developed in the master cylinders may be substantially equalized. Another object is to provide a braking system wherein a predetermined relationship may be maintained between the fluid pressures in the master cylinders regardless of unequal wear of the brake shoes in brakes actuated by the separate cylinders. A further object is to provide a braking system wherein the equalizing means is rendered ineffective upon failure of part of the system. Another object of my invention is to provide a hydraulic braking system having a master cylinder for supplying fluid under pressure to the front wheel brakes, another master cylinder for supplying fluid under pressure to the rear wheel brakes, and mechanical means for maintaining a predetermined relationship between the actuating forces exerted on the pistons of the master cylinders. Another object of my invention is to provide a fluid pressure braking system embodying two master cylinders and which can be constructed easily with a minimum of expense and which can readily be adapted to hydraulic braking systems now in use. Another object of my invention is to provide a hydraulic braking system embodying two master cylinders wherein the air or other gases can be readily vented from the master cylinders, and the fluid supply in each of the master cylinders can be readily maintained.

Further objects and advantages of my invention will become apparent from the following description of a preferred form thereof, reference being made to the accompanying drawings wherein:

Figure 1 is a diagrammatic plan view of the chassis of a motor vehicle embodying my invention; Figure 2 is a side elevation of the master cylinders and showing the actuating and equalizing means and diagrammatically illustrating the connection between the master cylinders and the wheel cylinders; Figure 3 is a vertical section, as indicated by the line 3—3 of Figure 4, on an enlarged scale, showing the master cylinders and equalizing mechanism; and Figure 4 is a transverse vertical section on a different scale taken along the line 4—4 of Figure 3.

In the drawings, I have illustrated a preferred form of my invention as applied to a conventional hydraulic braking system. The chassis frame of an automobile is indicated generally at C, the front wheels 10 and 11 being mounted on a conventional axle 12, and the rear wheels 13 and 14 likewise being mounted on a conventional axle 15. Each of the wheels is provided with a brake of any ordinary type, the front wheel brakes being actuated by pistons within the cylinders 16 and 17, respectively, and the rear wheel brakes being actuated by pistons within the cylinders 18 and 19, respectively.

Because of the greater load on the front wheels during deceleration, it is frequently considered desirable to expend more than half of the braking effort on the front wheels. In accordance with well known practice, therefore, the cylinders 16 and 17, as shown in Figure 2, may be of greater diameter than cylinders 18 and 19 in order to increase the expanding forces on the shoes of the front wheel brakes and correspondingly to increase the effectiveness of these brakes. The construction of the brakes and the details of construction of the wheel cylinders form no part of the present invention, however, and will not be described further herein.

In order to provide separate braking systems for the front and rear wheels so that a failure in the braking system connected to either the front or rear wheels will not prevent effective operation of the brakes of the remaining pair of wheels, I preferably provide two master cylinders 25 and 26, the fluid pressure produced in cylinder 25 being conducted through the metallic tubing 27, the flexible hose 28, the T-connection 29, and the metallic tubes 30 and 31, to the rear wheel cylinders 18 and 19, respectively. The fluid pressure generated in cylinder 26 is conducted through the metallic tube 35, through the fitting 36, the flexible hose 37 to the wheel cylinder 16, and through the metallic tube 38, the fitting 39 and flexible hose 40 to the cylinder 17.

It will be seen that by this arrangment I have provided in effect two separate braking systems whereby a failure in one of the braking systems will not prevent proper actuation of the brakes connected to the other system. While I may provide as many separate master cylinders as there are brakes, I preferably connect pairs of brakes to individual master cylinders so that a balanced braking effort will always be obtained and the skidding which might result from braking two wheels on one side of the car and only one wheel on the other side of the car prevented.

Preferably the lower master cylinder 26 which actuates the front wheel brakes is of larger diameter than cylinder 25 as shown in Figures 3 and 4, the diameters of the cylinders 25 and 26 being in the same proportion or bearing the same relationship to each other as the diameter of the rear wheel cylinders bears to the front wheel cylinders. By this arrangement, under normal conditions equal fluid pressures will be developed in the front and rear wheel cylinders by equal amounts of travel of the pistons within the two master cylinders. The greater amount of fluid required by the larger front wheel cylinders being compensated for by the greater diameter of the piston within the master cylinder 26.

In order to equalize the actuating pressures of the two braking systems, and thus, in the adaptation of my invention described herein, to maintain a desired predetermined ratio between the braking efforts expended on the front and rear wheels, I preferably employed actuating mechanism disclosed in Figures 2 and 3, wherein reference character 45 indicates a link which may be actuated by the brake pedal P through the lever 44 mounted on the pedal shaft S. The link 45 may be supported by a suitably mounted bushing 43 and is connected at its end to an intermediate portion of an equalizing bar 46 by any suitable pivotal connection as indicated at 47. The ends of the equalizing bar 46 are in turn pivotally connected as at 52 and 53 to the connecting rods 48 and 49 which actuate pistons 50 and 51 of the cylinders 25 and 26, respectively.

The parts just described may be mounted in the chassis of the vehicle in any desired manner as will be well understood by those skilled in the art. The construction of the pistons 50 and 51 and the associated mechanisms within the cylinders 25 and 26 is of conventional design and will not be described further herein.

To equalize the actuating pressures developed within the master cylinders 25 and 26 the pivotal connection 47 between the actuating link 45 and the equaliizng bar 46 is closer to the pivotal connection 53 than it is to the pivotal connection 52, the distances being inversely proportional to the areas of the respective cylinders. Thus assuming, as an example only, that the area of piston 50 is one square inch and the area of piston 51 to be one and one-half square inches, then if the pressures in the two cylinders are to be equalized it will be necessary to apply to piston 51 one and one-half times the force applied to piston 50. For example, assuming the fluid pressure within the cylinders to be one hundred pounds per square inch, the reaction on piston 50 would be one hundred pounds while the reaction on piston 51 would be one hundred and fifty pounds. To compensate for this difference, the lever arm, as indicated by A, Figure 3, on the equalizing bar 46 between the pivot 52 and the pivot 47 should be one and one-half times the lever arm B between the pivot 53 and the pivot 47. The foregoing figures are merely given by way of example, and under ordinary conditions there is usually not as great a difference between the areas of the pistons in the front and rear wheel cylinders as set out above. One usual practice is to apply about sixty per cent of the total braking effort to the front wheels and about forty per cent to the rear wheels.

It will be seen that by my mechanical equalizing device, the pedal pressure exerted on the link 45 will be divided between the pistons 50 and 51 through the equalizer bar and connecting rods in such a manner that the fluid pressures developed in the cylinders 25 and 26 will be substantially equal regardless of slight differences in the amounts of travel of the respective pistons required to build up the fluid pressures. Thus by this construction, I am able to compensate for differences in amount of actuating fluid required in the two systems due to uneven wear of the brake shoes, differences in adjustment of the brake, different amounts of expansion under pressure of the fluid lines in the two systems, and various other causes which will be appreciated by those skilled in the art. Compensation between the front and rear brakes is especially desirable in present day motor cars wherein more than half of the braking effort is expanded on the front wheels with the result that the brake shoes of the front wheels wear more rapidly than the brake shoes of the rear wheels. By my equalization system, it is possible to maintain the desired relationship between the braking effort expended on the front and rear wheels regardless of reasonable amounts of wear of the brake shoes.

Those skilled in the art will appreciate that, if desired, my system can be adapted to produce different fluid pressures in the different master cylinders, and at all times maintain a predetermined relationship between the pressures developed in the cylinders. This can readily be accomplished by varying the distances A and B between the pivotal connection 47 of the actuating bar with the connecting link 45 and the pivots for the respective connecting rods 48 and 49, thus varying the lengths of the lever arms which transmit the actuating forces to the connecting rods. For example, if the dimensions A and B shown on Figure 3 are equal, the actuating forces applied to the pistons will be equalized. With such an arrangement, a greater fluid pressure per unit of piston area will be developed in cylinder 25 than in cylinder 26 for the reason that piston 50 is of smaller area than piston 51, and the total pressure on pistons 50 and 51 must be equalized. Thus the unit fluid pressure developed will vary inversely as the areas of the pistons.

In order to prevent failure in the fluid pressure system associated with one of the cylinders from preventing proper actuation of the brakes associated with the other cylinder, I preferably provide the stop member 55 which may be formed integrally with, or otherwise rigidly mounted on the actuating link 45. The surfaces 56 and 57 of the stop member are adapted to engage opposite ends of the equalizing bar 46 after a predetermined amount of rocking movement of the bar with respect to the link 45 has taken place. Referring particularly to Figure 3 of the drawings, it will be seen that if a failure should take place in the fluid pressure system associated with cylinder 26, piston 51 would advance beyond piston 50 in cylinder 25 because of the fact that piston 51 would be subject to no back pressure. Under these circumstances, if the equalizing bar 46 were permitted to pivot freely with respect to the actuating link 45, it might be impossible to develop adequate fluid pressures in cylinder 25, or at least the effective stroke of the piston 50 in cylinder 25 would be materially reduced. By my arrangement, however, after a predetermined relative movement between the pistons has taken place, the surface 56 will engage the equalizing bar 46 in the region directly behind the connecting rod 48, so that no further relative rocking movement between the equalizing bar and the actuating link would be possible. After such engagement, the piston 50 will move as a unit with the actuating link 45, leaving an ample piston stroke to effectively apply the rear brakes associated with cylinder 25. Obviously, in the event of a failure in the rear braking system, the piston 50 would be advanced ahead of the piston 51 until the surface 57 engaged the opposite end of the equalizing bar 46, and thereafter the piston 51 would be advanced in the cylinder 26 to create the necessary actuating pressure for the front wheel brakes.

The spacing between the surfaces 56 and 57 and the adjacent surfaces of the equalizing bar is arranged to permit sufficient rocking movement of the equalizing bar and sufficient relative movement between the pistons 50 and 51 to compensate for all ordinary wear of the brake shoes and the various other factors previously enumerated. Thus my equalizing system will function to maintain the desired relationship between the fluid pressures developed under all ordinary circumstances, but upon loss of fluid pressure in one part of the system the equalizing means will be rendered ineffective to permit proper actuation of brakes not associated with that part of the system which has failed.

In order to provide a compact and convenient arrangement of the two master cylinders, I preferably dispose them one above the other, as shown in the drawings, with the larger master cylinder 26 at the bottom of the assembly. Both cylinders are provided with the customary vents, 60 and 61 in the master cylinder 25, and 62 and 63 in the master cylinder 26. To replenish the fluid in the master cylinders, I provide a reservoir 65 mounted generally above the assembly. The reservoir 65, however, is provided with a downwardly extending portion 66 which extends into communication with the vents 62 and 63. The vents may conveniently be formed in the cylinder 26 by drilling through the wall of the reservoir and thereafter the drilled holes may be closed with suitable plugs 67 and 68.

To prevent the draining of the reservoir completely in case of failure of the fluid system associated with one of the master cylinders, the reservoir is provided with a partition 70 extending upwardly from the master cylinder 25. By this arrangement the fluid for replenishing the fluid supply in the two master cylinders is separated so that the proper amount of fluid will be maintained in one of the master cylinders, even though there is a total failure of the fluid system associated with the other master cylinder. However, the filling of the reservoir requires no particular care inasmuch as the parts extend only part way to the top of the reservoir, and it is thus only necessary to pour in sufficient fluid through the single filler opening 71 to cover the partition 70.

From the foregoing description of a preferred form of my invention, it will be seen that I have provided a braking system wherein the failure of a single brake can not totally destroy the braking efficiency of the system. By my system, a failure in one of the front brakes does not affect the braking action of the rear brakes, and correspondingly a failure of a rear brake does not affect the braking action of the front brakes. Furthermore in my system, the actuating forces applied to the master cylinders may be maintained in definite relationships so that the fluid pressures developed in the cylinders may likewise be equalized or maintained in certain desired relationships regardless of variations in wear between the front and rear brakes, unequal expansion of the fluid systems, or various other factors affecting the amount of fluid required to actuate the brakes. My mechanical equalizing system is extremely simple and can be manufactured at low cost and by reason of the stop provided adjacent the equalizing bar, total failure of the fluid system associated with one master cylinder does not affect the action of the other master cylinder, while under all ordinary conditions proper equalization of the actuating pressures is always maintained.

My master cylinders are preferably arranged compactly one above the other, and in my design there is no problem in venting air from the cylinders or in replenishing the fluid supply to the individual cylinders. The compact arrangement which I have provided makes it possible to manufacture the cylinder assembly at low cost, while the single partitioned reservoir carried by the cylinders makes it possible to replenish the actuating fluid in precisely the manner employed with single master cylinders.

In the foregoing specification I have described a preferred form of my invention as applied to an automotive vehicle having four brakes. Various modifications and different adaptations of my invention will be evident to those skilled in the art. It is therefore to be understood that my invention is not limited to the preferred form described herein or in any manner other than by the scope of the appended claims.

I claim:

1. A fluid pressure brake system comprising in combination, front wheel brakes and rear wheel brakes, front wheel brake actuating cylinders and rear wheel brake actuating cylinders, said front wheel cylinders being larger than said rear wheel cylinders, a master cylinder for supplying actuating fluid to said rear wheel cylinders, another master cylinder for supplying actuating fluid to said front wheel cylinders, the diameters of said master cylinders bearing the same relationship to each other as the diameters of said rear and front wheel cylinders bear to each other, separate pistons in said master cylinders, a single actuating means for said pistons, linkage between said actuating means and said pistons, and means in said linkage for equalizing the fluid pressures developed by said pistons, said means for equalizing the fluid pressures comprising a bar pivoted intermediate its ends to a link actuated by said actuating means, and pivoted at its ends to the connecting rods for said pistons, the distances between said intermediate pivot and said connecting rod pivots being inversely proportional to the areas of the pistons actuated by the respective connecting rods.

2. A fluid pressure brake system comprising in combination, front wheel brakes and rear wheel brakes, front wheel brake actuating cylinders and rear wheel brake actuating cylinders, said front wheel cylinders being larger than said rear wheel cylinders, a master cylinder for supplying actuating fluid to said rear wheel cylinders, another master cylinder for supplying actuating fluid to said front wheel cylinders, the diameters of said master cylinders bearing the same relationship to each other as the diameters of said rear and front wheel cylinders bear to each other, separate pistons in said master cylinders, a single actuating means for said pistons, linkage between said actuating means and said pistons, and means in said linkage for maintaining a predetermined relationship between the fluid pressures developed by said pistons.

3. A fluid pressure brake system comprising in combination a plurality of brakes, brake actuating cylinders associated with said brakes, some of said brake actuating cylinders being of larger diameter than others, a master cylinder for supplying actuating fluid to the larger of said brake actuating cylinders, another master cylinder for supplying actuating fluid to the smaller of said brake actuating cylinders, the diameters of said master cylinders bearing the same relationship to each other as the diameters of said larger and smaller brake actuating cylinders bear to each other, separate pistons in said master cylinders, a single actuating means for said pistons, linkage between said actuating means and said pistons, and means in said linkage for maintaining a predetermined relationship between the fluid pressures developed by said pistons.

4. A fluid pressure brake system comprising in combination, front wheel brakes and rear wheel brakes, front wheel brake actuating cylinders and rear wheel brake actuating cylinders of different diameters, a master cylinder for supplying actuating fluid to said rear wheel cylinders, another master cylinder for supplying actuating fluid to said front wheel cylinders, the diameters of said master cylinders bearing the same relationship to each other as the diameters of said rear and front wheel cylinders bear to each other, separate pistons in said master cylinders, a single actuating means for said pistons, linkage between said actuating means and said pistons, and force proportioning means in said linkage for maintaining a predetermined relationship between the actuating forces applied to said pistons, and means for rendering said force proportioning means ineffective upon loss of fluid pressure in either of said master cylinders.

5. A fluid pressure braking system comprising in combination at least two brake actuating cylinders of different diameters, two master cylinders, one of said master cylinders having a greater diameter than the other, means for conducting actuating fluid from one of said master cylinders to one of said brake actuating cylinders, means independent of said first named means for conducting actuating fluid from the other of said master cylinders to another of said brake actuating cylinders, manually controllable means for applying actuating forces to said master cylinders, and lever means associated with said manually controllable means for applying greater actuating force to the larger of said master cylinders than to the smaller of said master cylinders thereby substantially equalizing the fluid pressures developed in said master cylinders.

6. A fluid pressure braking system comprising in combination a plurality of brakes, brake actuating cylinders associated with said brakes, a master cylinder for supplying actuating fluid to at least one of said brake actuating cylinders, another master cylinder for supplying actuating fluid to at least one other of said brake actuating cylinders, pistons in said master cylinders, one of said pistons being larger than the other, a single actuating means for said pistons, and means associated with said actuating means for causing a greater actuating force to be applied to the larger of said pistons than to the smaller of said pistons.

7. In a fluid pressure braking system, a pair of master cylinders disposed one above the other and arranged to supply actuating fluid to separate and independent parts of the braking system, a reservoir for actuating fluid disposed above and extending along said cylinders having an upper portion, a lower portion and a partition between said portions projecting above the upper of said cylinders, said lower portion extending downwardly along the side of the upper of said cylinders into a zone adjacent the lower of said cylinders, the wall of the upper of said cylinders forming one wall of the lower portion of said reservoir, a vent extending from the upper of said cylinders to said upper portion, and a vent extending from the upper inner surface of the lower of said cylinders to said downwardly extending portion.

8. A fluid pressure braking system comprising in combination front wheel brakes and rear wheel brakes, front wheel brake actuating cylinders and rear wheel brake actuating cylinders differing in diameter from said front wheel brake actuating cylinders, two master cylinders, one of said master cylinders being larger than the other, means for conducting actuating fluid from the larger of said master cylinders to the larger of said actuating cylinders, means entirely independent of said first named means for conducting actuating fluid from the smaller of said master cylinders to the smaller of said actuating cylinders, separate pistons in said master cylinders, a brake pedal, linkage between said pedal and said pistons, and means in said linkage for maintaining a predetermined relationship between the actuating forces applied to said pistons.

ALBERT J. WEATHERHEAD, JR.